United States Patent
Young et al.

[11] Patent Number: 6,154,195
[45] Date of Patent: Nov. 28, 2000

[54] SYSTEM AND METHOD FOR PERFORMING DITHERING WITH A GRAPHICS UNIT HAVING AN OVERSAMPLING BUFFER

[75] Inventors: Eric S. Young, San Jose; Randy X. Zhao; Anoop Khurana, both of Freemont; Roger Niu, San Jose; Dong-Ying Kuo, Pleasanton; Sreenivas R. Kottapalli, Milpitas, all of Calif.

[73] Assignee: S3 Incorporated, Santa Clara, Calif.

[21] Appl. No.: 09/079,973

[22] Filed: May 14, 1998

[51] Int. Cl.[7] .............................. G09G 5/04; G09G 5/10; H04N 1/40

[52] U.S. Cl. .................... 345/153; 345/154; 345/147; 345/149; 358/455; 358/456; 358/457

[58] Field of Search ..................... 345/153, 154, 345/147, 149; 358/455, 457, 456

[56] References Cited

U.S. PATENT DOCUMENTS

| 4,612,540 | 9/1986 | Pratt | 345/147 |
|---|---|---|---|
| 5,278,670 | 1/1994 | Eschbach | 358/455 |
| 5,734,369 | 3/1998 | Priem et al. | 345/153 |
| 5,777,599 | 7/1998 | Poduska, Jr. | 345/136 |

*Primary Examiner*—Richard A. Hjerpe
*Assistant Examiner*—Duc Dinh
*Attorney, Agent, or Firm*—Fenwick & West LLP

[57] ABSTRACT

A dither unit preferably comprises an offset generator, an adjusted coordinate generator and a dither matrix. The offset generator is coupled to receive information about the relative position of the sub-sample being dithered, and in response generates offset values. The output of the offset generator along with the pixel coordinates are provided to the adjusted coordinate generator which generates adjusted coordinate values used by the dither matrix. The adjusted coordinate values along with a color value are received by the dither matrix, which in response, generates a dithered value for the sub-sample that can be stored back in the over sampling buffer for additional computation.

20 Claims, 9 Drawing Sheets

SYSTEM AND METHOD FOR PERFORMING DITHERING WITH A GRAPHICS UNIT HAVING AN OVERSAMPLING BUFFER

BACKGROUND OF THE INVENTION

1. Field of the Invention.

The present invention relates generally to systems and methods for rendering graphic images on a display device. In particular, the present invention relates to a system and a method for performing ordered dithering in a graphic system using an over sampling buffer.

2. Description of the Background Art.

With the development and proliferation of computers of increasing performance, computers are now being used for a variety of graphical operations. It is typical for current personal computer systems to include a graphics accelerator or graphics card that is used by the personal computer system in rendering graphic images on the display device. While displays were once limited to ASCII text, graphic images including real time video are now computationally practical.

Current images are represented as a screen or rectangle of pixels 680 pixels by 480 pixels, 800 pixels by 600 pixels, or larger. In order to represent images realistically, each pixel must be represented by 24 bits of true color. Thus, the storage of a full screen image requires over 900K bytes (680×480×24 bits) of storage space. However, the cost for providing storage and processing of 24 bits of true color pixels makes full screen color graphics prohibitively expensive. Furthermore, the performance degradation because of limited memory bandwidth is also a problem. Therefore, there is a need to reduce the memory and processing costs of providing 24 bits per pixel for true colors.

The prior art has attempted to solve this problem by reducing the number of bits used to represent each pixel. Such attempts use 16-bits per pixel for color images. This compresses the size and required process for a full screen image by about a third to 600K bytes (680×480×16 bits). However, this approach has several disadvantages. First, the use of only 16 bits per pixel creates color-banding artifacts when color gradients are present. Second, colors produced with only 16 bits do not allow for the generation of the full range of intensities due to the loss of precision since fewer bits are available for each color channel.

In order to remove the problems identified above including the significant visual artifacts created through the use of 16-bit color, one solution has been to use 16-bit color in conjunction with an over sampling buffer. An over sampling buffer operates to receive the 16-bit color data from the graphics controller or frame buffer, and for computational purposes generates sub-samples of the 16-bit color data for each pixel. One conventional method represents each pixel in memory with a data word and translates to and from eight sub-samples, each sample having the same size as the data word, eight sub-samples per pixel used in the over sampling buffer. For example, an eight times over sampling buffer can make 16-bit color nearly the same as 24-bit color in quality.

However, when such an approach using over sampling is undertaken, other operations on the pixel data such as dithering do not provided the desired outcome. Dithering is typically performed on images to enhance their quality and reduce banding effects. However, when an over sampling buffer is also used, the conventional dithering method, processes and algorithms do not produce the desired effect. Using the conventional dither method with an over sampling buffer introduces additional artifacts in the image. Therefore, there is a need for a system and methods for performing dithering that is effective when used with an over sampling buffer.

Therefore, there is a need for a system and method that reduces the computational and memory requirements for providing a high quality true color image, and for a system for performing dithering that is compatible with use of an over sampling buffer.

SUMMARY OF THE INVENTION

The present invention overcomes the deficiencies and limitations of the prior art with a system and methods for performing dithering on over sampled image data. In particular, the system of the present invention is a graphic engine including, among other components, an over sampling buffer and a dither unit. The present invention is particularly advantageous because it provides a dither unit that is able to perform dithering on sub-samples of a pixel. The dither unit preferably comprises an offset generator, an adjusted coordinate generator and a dither matrix. The offset generator is coupled to receive information about the relative position of the subsample being dithered, and in response generates offset values. The outputs of the offset generator along with the pixel coordinates are provided to the adjusted coordinate generator which generates adjusted coordinate values used by the dither matrix. The adjusted coordinate values along with a color value are received by the dither matrix, which in response, generates a dithered value for the sub-sample that can be stored back in the over sampling buffer for additional computation. The present invention further comprises a method for performing dithering including the steps of: generating an offset value, creating adjusted coordinate values using the offset value and the original pixel coordinates, applying a color value and the adjusted coordinate values to a dither matrix to produce a dithered color value.

DETAILED DESCRIPTION OF THE PREFERRED EMBODIMENTS

Figure 1:
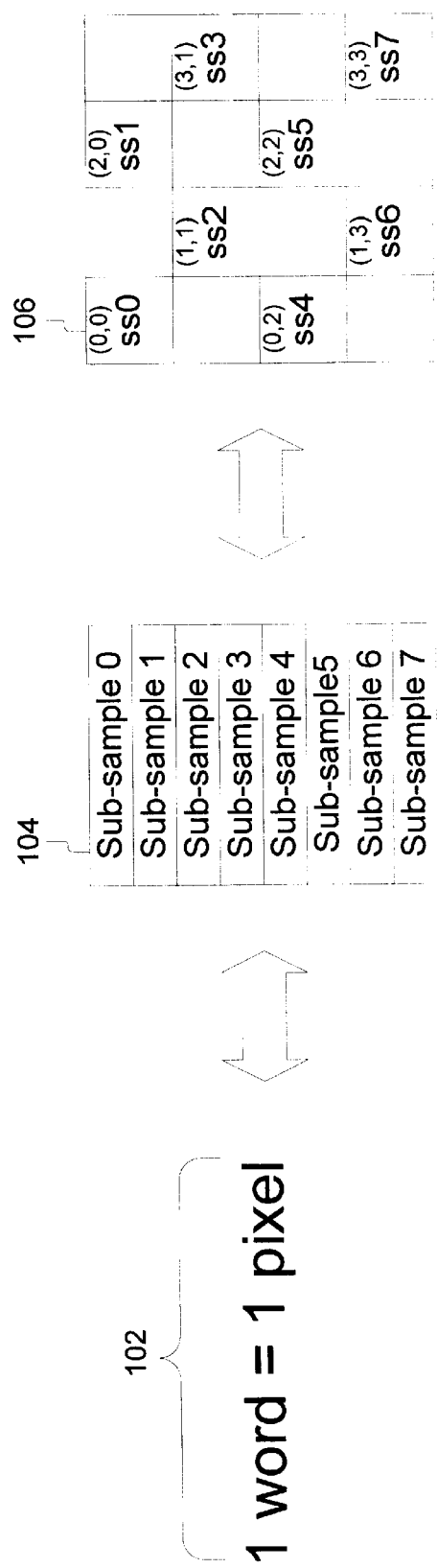
FIG. 1 is a diagram illustrating the relationship between a pixel stored as a word in the frame buffer, the sub-samples stored in the over sampling buffer, and the position of the sub-samples as portions of the pixel.

Referring now to FIG. 1, the relationship between a pixel stored as a word in the frame buffer, the sub-samples stored in the over sampling buffer, and the position of the sub-samples as portions of the pixel is shown. While the present invention will now be described in the context of 16-bit words being used to achieve close to 24-bit true color, those skilled in the art will recognize that the present invention may be applied to a variety of other word sizes to achieve the same computational, storage and hardware savings. In order to decrease the storage and memory bandwidth requirements for graphics operations, the present invention preferably reads and stores the pixels in memory or frame buffer as a single word, such as a 16-bit word, as shown by 102. The over sampling buffer produces from these words in memory a plurality of sub-samples, preferably eight, when reading from the memory and reduces plurality of sub-samples to a single word when storing to the memory. For example, each of the sub-samples 0–7 could be an eight bit word. While the sub-samples 0–7 are shown at 104 as eight blocks or words in the over sampling buffer, they could be eight portions of a 64-bit word. Each of the sub-samples 0–7 corresponds to a portion of the pixel as shown in 106. Through the use of the over sampling buffer color graphic image quality close to true 24-bit color true color can be achieved with 33% less memory bandwidth and memory storage space.

Figure 2:
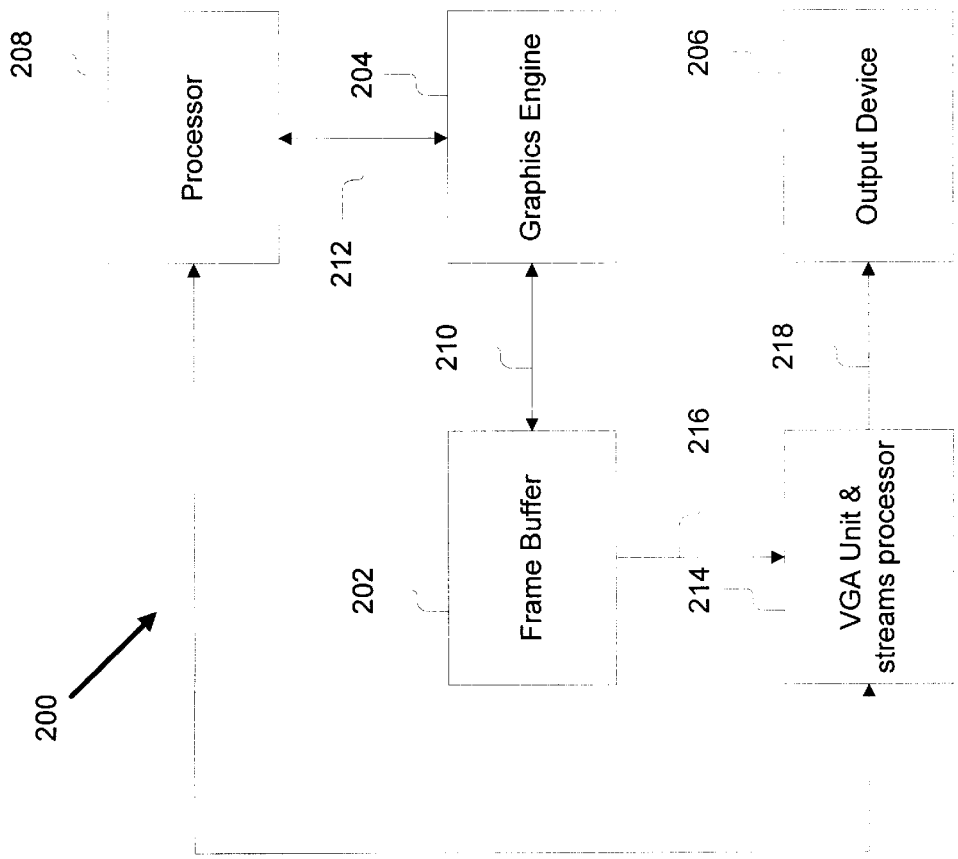
FIG. 2 is a block diagram of a system including a preferred embodiment of the present invention.

Referring now to FIG. 2, a block diagram of a system 200 including a preferred embodiment of the present invention is shown. The system 200 preferably comprises a frame buffer 202, a graphics engine 204, an output device 206, a processor 208, and a VGA unit 214. The system 200 may also include main memory, an input device, a data storage device and a network interface, although not shown. The processor 208 is coupled to the graphics engine 204 and the frame buffer 202 and in a von Neuman architecture such as in personal or mini computer. The processor 208 is preferably a microprocessor such as an Intel Pentium; the output device 206 is preferably a video monitor; and the frame buffer 202 is preferably random access memory (RAM). The graphics engine or accelerator 204 includes conventional functionality including 2D graphics processing, 3D graphics processing, an video image processing, such as in the ViRGE integrated 3D accelerator manufactured and sold by S3 Incorporated of Santa Clara, Calif. The graphics engine 204 preferably includes additional functionality as will be detailed below for performing dithering according to the present invention. As shown, the graphics engine 204 is coupled via line 210 to the frame buffer 202 for sending and receiving data to be rendered on the output device 206. The graphics engine 204 is also coupled by line 212 to the processor 208 to receive data and commands for rendering images on the output device 206. The frame buffer 202 is also coupled by the VGA unit 214 and lines 216, 218 to the output device 206. The VGA unit 214 is of a conventional type and uses the data in the frame buffer to generate the signals to control the output device 206. For example, the VGA unit 214 may include a streams processor, RAMDAC, and color palette such as in the ViRGE integrated 3D accelerator manufactured and sold by S3 Incorporated of Santa Clara, Calif.

Figure 3:
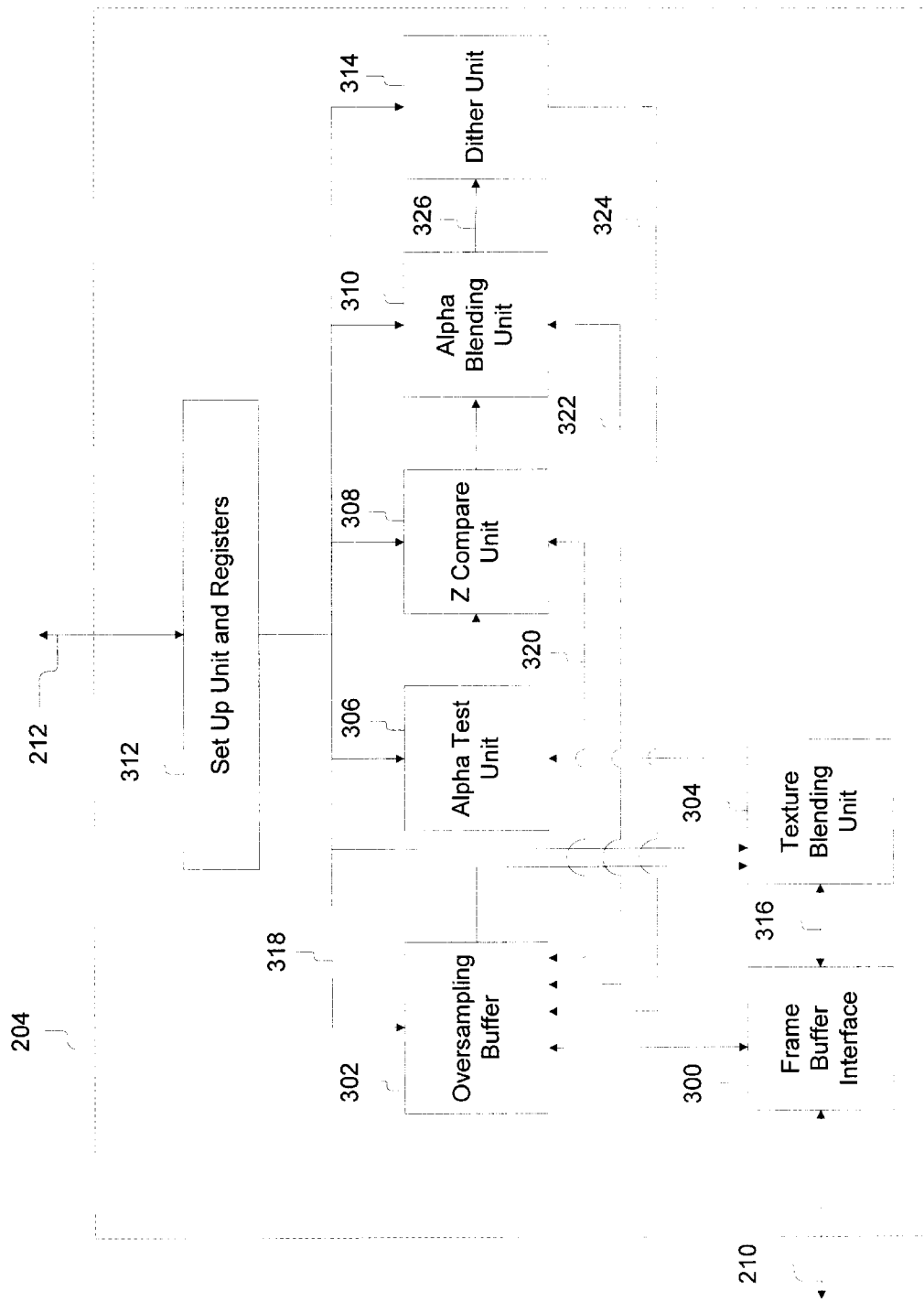
FIG. 3 is block diagram of a graphics engine constructed according to a preferred embodiment of the present invention.

Referring now to FIG. 3, portions of the graphics engine 204 relating to the present invention are shown in more detail. The graphics engine 204 preferably comprises a frame buffer interface 300, an over sampling buffer 302, a texture blending unit 304, an alpha test unit 306, a Z compare unit 308, an alpha blending unit 310 and a setup unit or engine and registers 312, and a dither unit 314. While each of the units 300, 302, 304, 306, 308, 310, 312 and 314 will now be described as a functional unit with specific coupling to the frame buffer 202 and the processor 208, those skilled in the art will recognize that in alternate embodiments, the units 300, 302, 304, 306, 308, 310, 312 and 314 could be routines executed by a graphics engine.

As shown in FIG. 3, the frame buffer interface 300 is coupled to bus/line 210 to send and receive data to and from the frame buffer 202. The frame buffer interface 300 is also coupled to the texture blending unit 304 via line 316 to provide data from the frame buffer 202 to the texture blending unit 304. The over sampling buffer 302 is also coupled to the frame buffer 202 by the frame buffer interface 300. The alpha test unit 306, the Z compare unit 308, the alpha blending unit 310 and the dither unit 314 all receive or send data to the frame buffer 202 through the over sampling buffer 302 and the frame buffer interface 300. For example, the frame buffer interface 300 includes much of the functionality of conventional memory interface units of existing graphic accelerators.

The setup unit and registers 312 receive commands and data from the processor 208 and store them for use by the over sampling buffer 302, the texture blending unit 304, the alpha test unit 306, the Z compare unit 308, the alpha blending unit 310 and the dither unit 314. More specifically, the setup unit and registers 312 store data per triangle that indicate the size, shade, shape, blending and other rendering characteristics. The setup unit and registers 312 are coupled by line 212 to send and receive commands and data to and from the processor 208. The setup unit and registers 312 are also coupled to the over sampling buffer 302, the texture blending unit 304, the alpha test unit 306, the Z compare unit 308, the alpha blending unit 310 and the dither unit 314 to pass on data and commands specifying how each unit 302, 304, 306, 308, 310, 312, 314 is to process data from the frame buffer 202. The coupling through the setup unit and registers 312 also provides operands and other information that the respective units 302, 304, 306, 308, 310, 312, 314 may need to perform their rendering functions.

The over sampling buffer 302 is also coupled by the frame buffer interface 300 to send and receive data to and from the frame buffer 202. The over sampling buffer 302 is also coupled to the setup Unlit and registers 312 by line 318, and thus, the processor 208. An output of the over sampling buffer 302 is coupled to an input of the texture blending unit 304. The over sampling buffer 302 translates data and then receives or sends the data to or from the frame buffer 202.

More specifically, the present invention preferably stores the color words representing the pixels in the frame buffer 202 with one word per pixel, as illustrated in FIG. 1. The word size is preferably 16 bits to reduce the memory storage and bandwidth requirement of the frame buffer 202. However, true color operating on 24 bits is preferred to produce higher quality images.

This difference in word sizes can best be understood with reference to FIG. 1. FIG. 1 illustrates the relationship between the pixel words as stored in the frame buffer 202, the sub-samples stored in the over sampling buffer 302 and the over sampled values 106 in relation to each other. As shown, each pixel to be rendered on the display is preferably represented as a 16-bit word in the frame buffer 202. Through the use of over sampling, the 16-bit word is used to generate eight 16-bit words or sub-samples that represent the pixel. The over sampling buffer 302 includes conventional control logic controllable by the setup unit and registers 312 to use data from the frame buffer 202 to create eight sub-samples per pixel. FIG. 1 also shows graphically the relationship of each of the sub-samples to each other in forming the pixel. The over sampling buffer 302 preferably stores the eight sub-samples in sequence consecutively as shown in the middle of FIG. 1. These eight sub-samples can in turn be used to generate the equivalent of 24-bit color. By using a matrix as shown in FIG. 1, sub-samples 0–7 are used as a substitute for storing 24-bit color per pixel in the frame buffer 202. The over sampling buffer 302 preferably has storage sufficient to hold eight sub-samples for each pixel in the frame buffer 202. The over sampling buffer 302 also includes control logic for storing the eight sub-samples representing a pixel back as a single 16-bit word in the frame buffer 202. After the triangle processor (collectively the set up engines and other units) renders the sub-samples to the over sampling buffer 302, the over sampling buffer 302 filters down the eight sub-samples down to a respective pixel in the frame buffer 202. In particular, the over sampling buffer 302 simply averages the eight sub-samples in the over sampling buffer 302 down to a pixel, and then writes the pixel to the frame buffer 202.

The texture blending unit 304 has inputs and outputs and is coupled to receive the output of the over sampling buffer 302. The texture blending unit 304 is coupled to the setup unit and registers 312 to receive commands and data. The texture blending unit 304 is also coupled to the frame buffer interface 300 to provide data without passing through the other units 306, 308, 310. The texture blending unit 304 performs conventional operations for blending a diffuse color with textures. The output of the texture blending unit 304 is provided as an input to the alpha test unit.

Similarly, the alpha test unit 306 has inputs and an output and is coupled to receive the output of the texture blending unit 304. The alpha test unit 306 is coupled to the setup unit and registers 312 to receive commands and data. The alpha test unit 306 is also coupled to output of the texture blending unit 304 to receive data upon which an alpha test is performed. The output of the alpha test unit 306 is coupled to an input of the Z compare unit 308. The alpha test unit 306 performs conventional pixel rejection for specific alpha ranges. More particularly, the alpha test compares the alpha value of a pixel to a threshold that is preferably received from the set up unit and registers 312. The comparison type, =><, is also received from the set up unit and registers 312. If the alpha value for a given pixel is greater than or equal to the threshold, then the pixel value is output by the Z compare unit 308 and passed on to the Z compare unit 308. If the alpha value for a given pixel is not greater than or equal to the threshold then the pixel is rejected without additional processing. The output of the alpha test unit 306 is provided as an input to the Z compare unit 308.

Likewise, the Z compare unit 308 has inputs and outputs and is coupled to receive the output of the alpha test unit 306. The Z compare unit 308 is coupled to the setup unit and registers 312 to receive commands and data. The Z compare unit 308 is also coupled to the over sampling buffer 320 via line 320 to provide data without passing through the alpha blending unit 310, and to receive data to be processed directly from the over sampling buffer 302. The Z compare unit 308 performs a conventional Z comparison that is used to allow the programmer to eliminate the rendering of hidden lines and surfaces based on the Z value. The output of the Z compare unit 308 is provided as an input to the alpha blending unit 310.

The alpha blending unit 310 has inputs and an output, and is coupled to receive the output of the Z compare unit 308. The alpha blending unit 310 is coupled to the setup unit and registers 312 to receive commands and data. The alpha blending unit 310 is also coupled to the over sampling buffer 302 to receive the source or destination values for the pixels.

The alpha blending unit 310 performs both conventional alpha blending and also alpha blending for pixels represented by multiple sub-sample words. For example, the present invention is described in terms of each pixel having eight sub-samples of 16-bits each. However, those skilled in the art will recognize that the present invention is applicable to numbers of sub-samples other than eight and word sizes other than 16 bits. As has been noted above, the alpha blending operation provides the user with the ability to create images that appear transparent by blending a source image with a background or destination image. The output of the alpha blending unit 310 is coupled to the input of the dither unit 314.

Finally, the dither unit 314 has inputs and outputs, and is coupled to receive the output of the alpha blending unit 310. The dither unit 314 is coupled to the setup unit and registers 312 by line 318 to receive commands and data. The dither unit 314 is also coupled to the over sampling buffer 302 to receive data used for dithering and for storing dithered data back in the over sampling buffer 302. Yet another input of the dither unit 314 is coupled to line 326 to receive alpha blended data for sub-samples and pixels from the alpha blend unit 310. The dithering unit 314 will be described in more detail below, but performs color dithering according the values output by the alpha blending unit 310, and the input from the setup unit and registers 312 that provides the pixel position (x, y) and the pixel mask signal (sub-sample position).

Figure 4:
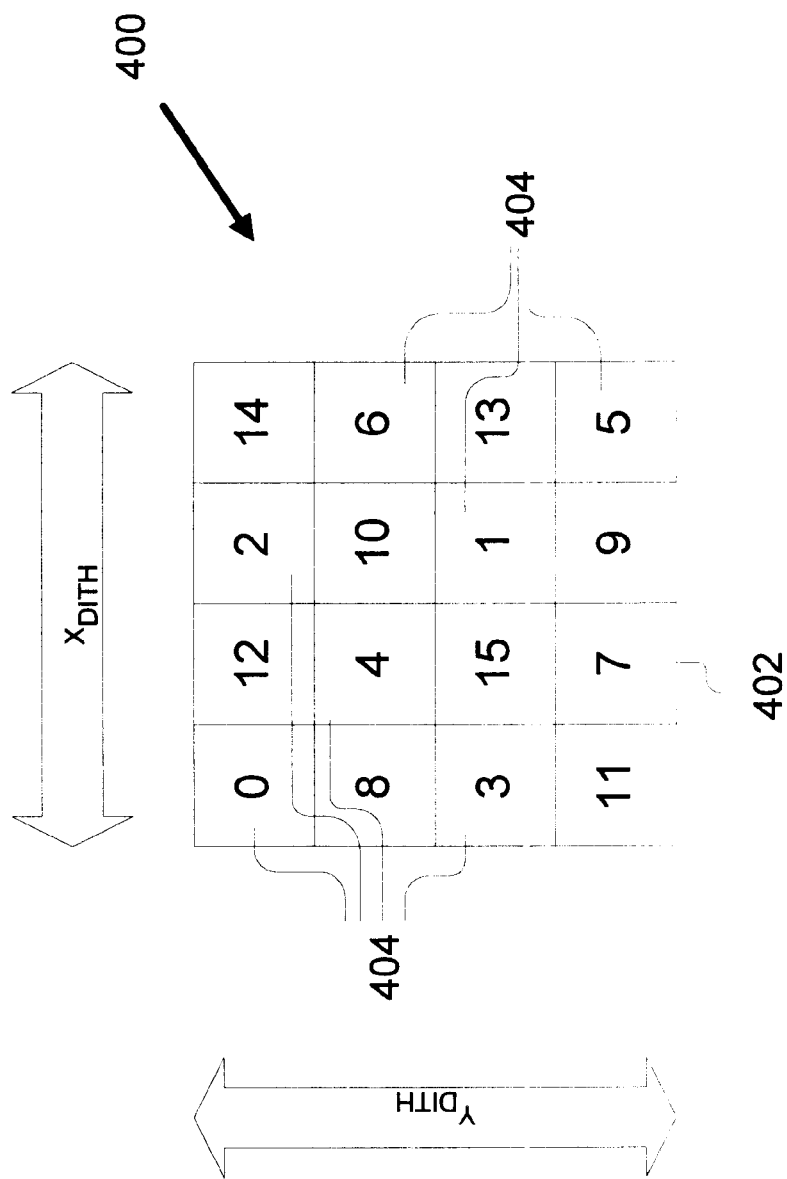
FIG. 4 is block diagram of an exemplary dither matrix used by the dither unit of the present invention.

FIG. 4 shows an exemplary embodiment for a dither matrix 400 used in a preferred embodiment of the present invention. Those skilled in the art will recognize that the dither matrix 400 may have a variety of other patterns of values. The dither matrix 400 specifies which of the sub-samples will have an output color value in response to the application of an (x, y) value or intensity value. The (x, y) value specifies a location in the matrix 400 used to bias the color value output by the dither unit 314. For example, if an input (x, y) value references a particular location 402, then that location 402 and its corresponding sub-sample are compared with the value of a color input to the matrix 400 at location 402. If the input color value plus the value from the matrix location specified by the (x, y) coordinates is greater than a predetermined threshold, then the color value is incremented by one. More specifically, the present invention preferably receives an input color value of eight bits [7. . . 0], and the matrix values range from zero (0000) to fifteen (1111). In the present invention, 24 bits of true color are input, eight bits per channel, and 16 bits of color are output (5,6,5 bits per channel respectively, for RGB). In the preferred embodiment, the color value output is preferably 5 bits, and the least significant bits of the input color value [2:0] are summed with the matrix value corresponding to the (x, y) input. Depending on whether it is a 5 or 6 bit channel being dithered, the value that is obtained from the matrix needs to be shifted accordingly. This allows the matrix to be scaled down in the correct range. For a 5 bit color channel, the matrix value needs to be right shifted by 1, resulting in matrix ranges from zero (000) to seven (111). For 6 bit color channel, the matrix value needs to be right shifted by 2, resulting in a matrix range from zero (00) to three (11). If the sum generates a carry (in other words is 1000 or greater for 5-bit) then one is added to the five most significant bits of the color value [7:3], and the three least significant bits of the input color value [2:0] are discarded to produce the new output color value that is 5 bits. If the location having 0 is indexed then the sub-sample will not be biased since zero added to the three least significant bits of the input color value [2:0] will not generated a carry. Those skilled in the art will recognize that this is just one of a number of dither matrices that may be used with the present invention. Furthermore, those skilled in the art will recognize that this is the process for only one channel such as the Red channel that produces 5 bits of output color. The Green and Blue channels are dithered in a similar manner to produce six bits of output color for the Green channel and five bits of output color for the Blue channel.

Figure 5:
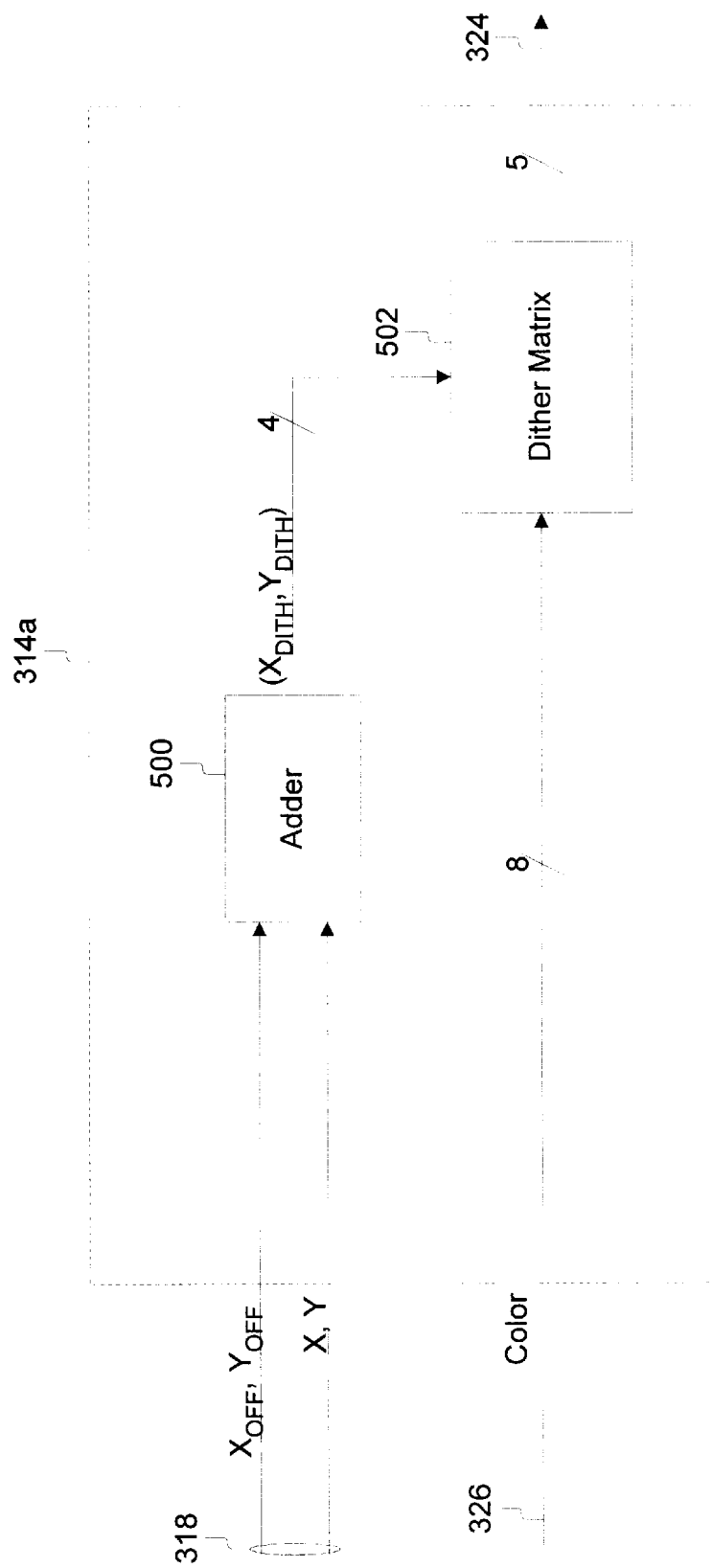
FIG. 5 is a first and preferred embodiment of a dither unit constructed according to the present invention.

While the present invention will now be described in terms of a specific color channel that receives eight bits of input color and outputs five bits of output color, those skilled in the art will recognize that the dither unit 314, applies equally for receiving eight bits of input color and outputting five bits of color. Furthermore, those skilled in the art will also realize that the dither unit 314 may also include a separator and a combiner (not shown) or logic to receive and separate a channel from color input signal that is a 24-bits RGB888 (3 bytes) format and a combiner (not shown) or logic for providing a 16-bit RGB565 (packed in 2 Bytes) for the color. Referring now to FIG. 5, a first and preferred embodiment of a dither unit 314a constructed according to the present invention is shown. The dither unit 314a preferably comprises an adjusted coordinate generator 500 and a dither matrix 502. The adjusted coordinate generator 500 is preferably an adder, and has a first input, a second input and an output. The adjusted coordinate generator 500 produces adjusted coordinate values used to index the dither matrix 502. In this embodiment, the inputs to the adjusted coordinate generator 500 are provided by the setup unit and registers 312. In particular, the setup unit and registers 312 provides a first signal that indicates the x and y coordinate values for the pixel being dithered, and a second signal that indicates the x and y offset for the sub-sample of the pixel being dithered. The first and second inputs of the adjusted coordinate generator 500 are coupled to line 318 to receive the x and y values and the offset from the setup unit and registers 312. The output of the adjusted coordinate generator 500 provides x and y dither inputs which equal $(x+x_{offset})$ and $(y=y_{offset})$, respectively. The dither matrix 502 has a first input, a second input and an output, and generates a dithered value for the sub-sample based on an input x and y value, and a color value. The first input of the dither matrix 502 is coupled to line 326 to receive a color value output by the alpha blending unit 310. The second input of the dither matrix 502 is coupled to the output of adjusted coordinate generator 500 to receive the x and y dither inputs. The output of the dither matrix 502 is coupled to line 324 to provide the dither value for storage back in the over sampling buffer 302. While the output is shown for five bits as used for the red and blue channels, those skilled in the are will recognize that a six bit output value is possible for the green channel. The dither matrix 502 is preferably a Bayer dithering matrix or algorithm such that banding artifacts are reduced by application of the dither matrix 502. In particular, this type of dither matrix 502 reduces banding significantly to get smoother transitions between color gradients. The present invention advantageously uses both the screen position and the over sampling position must be taken into account to effectively dither the image. In particular, the adjusted coordinate generator 500 the (X, Y) position in screen space as well as the (X, Y) fractional offset in the over sampling space to produce new or adjusted values of the (X, Y) position for indexing into the Bayer dither matrix. This potentially gives more than 1 color value for each of 8 sub-samples inside a pixel depending on pixel position (X, Y), sub-sample offset $(X_{off}, Y_{off})$, and the color.

Figure 6:
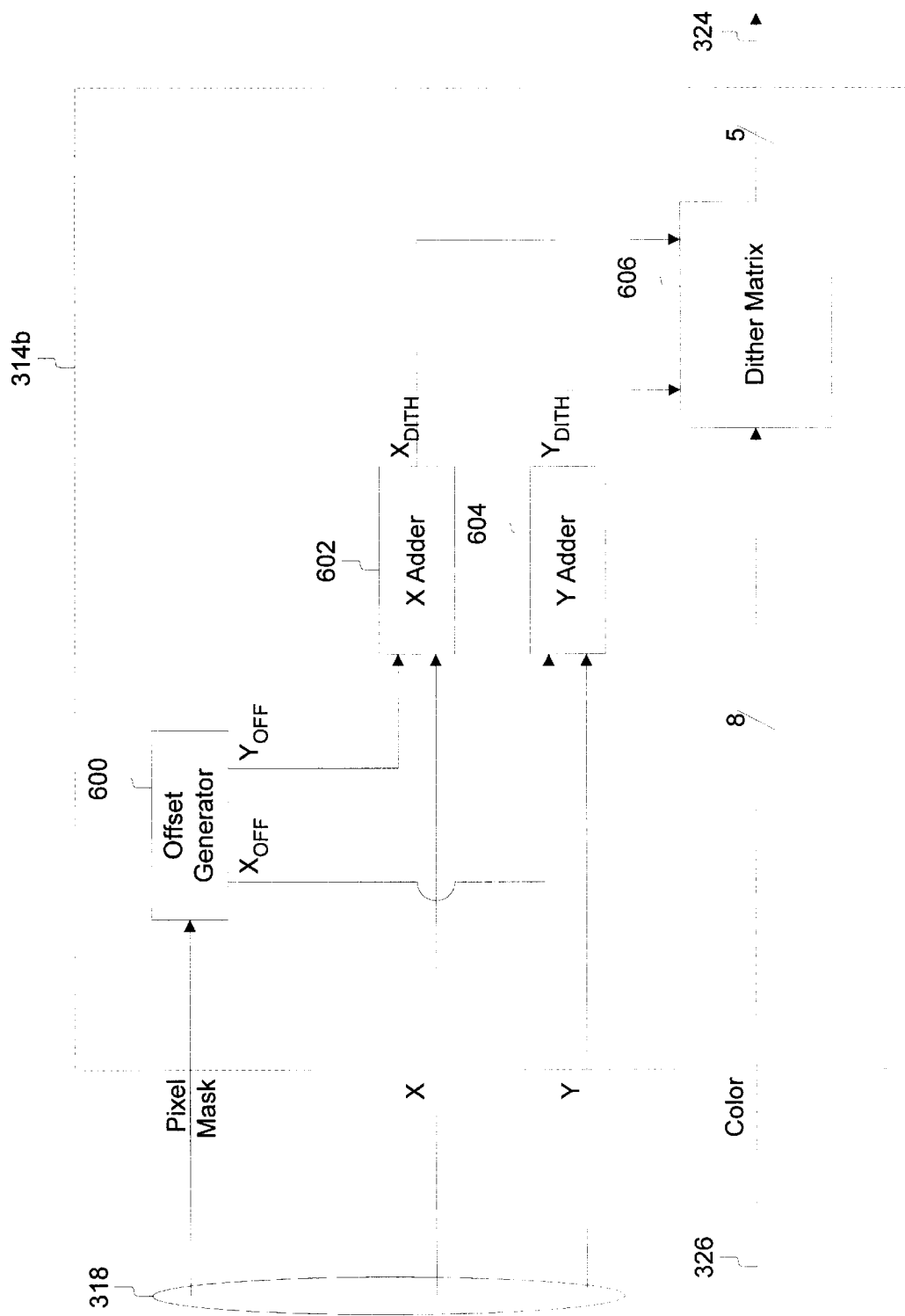
FIG. 6 is a second embodiment of the dither unit constructed according to the present invention.

FIG. 6 shows a second embodiment of the dither unit 314b constructed according to the present invention. The dither unit 314b preferably comprises an offset generator 600, an adjusted coordinate generator formed from a first and second adder 602, 604 and a dither matrix 606. This embodiment 314b is similar to the first embodiment, however, the sub-sample position is determined by the offset generator 600, and the dither matrix 606 has separate inputs for the $X_{dith}$ and $Y_{dith}$ values. As shown in FIG. 6, the pixel mask signal is provided by the setup unit and registers 312 on line 318 to the offset generator 600. The pixel mask signal indicates which sub-samples are being modified, and their sub-sample position can be determined. The pixel mask signal is preferably an eight bit number with one bit to indicate which of the eight sub-samples are being modified, and therefore, dithered. As best shown in FIG. 1, by knowing which sub-sample is being processed, its position or offset is know as shown in FIG. 1 by the position of the sub-samples as portions of the pixel 106. Based on the pixel mask, the sub-sample is identified as being one of the eight sub-samples, and the offset generator 600 outputs the X and Y offsets corresponding to the sub-samples location. For example for sub-sample 0, the X and Y offsets are (0,0) and the present invention uses the binary value of 00 as the X offset value and the binary value of 00 for the Y offset value. Similarly, for sub-sample 7. the X and Y offsets are (3, 3) and the present invention uses the binary value of 11 as the X offset value and the binary value of 11 for the Y offset value. Therefore, the offset generator 600 outputs a value for the X offset that is either 00, 01, 10 or 11; and a value for the Y offset that is either 00, 01, 10 or 11. The X offset is output as a first input to the first adder 602. The second input of the first adder 602 is provided by the setup unit and registers 312, and is a signal indicating the X position of the pixel being dithered. The output of the first adder 602 is applied to an input of the dither matrix 606. Similarly, the Y offset is output and provided as a first input to the second adder 604. The second input of the second adder 604 is provided by the setup unit and registers 312, and is a signal indicating the Y position of the pixel being dithered. The output of the second adder 604 is applied to another input of the dither matrix 606. The final input to the dither matrix 606 is provided on line 326 by the alpha blending unit 310. The dither matrix 606 is similar to the dither matrix 502 of the second embodiment and provides the same functionality and similar couplings.

Figure 7:
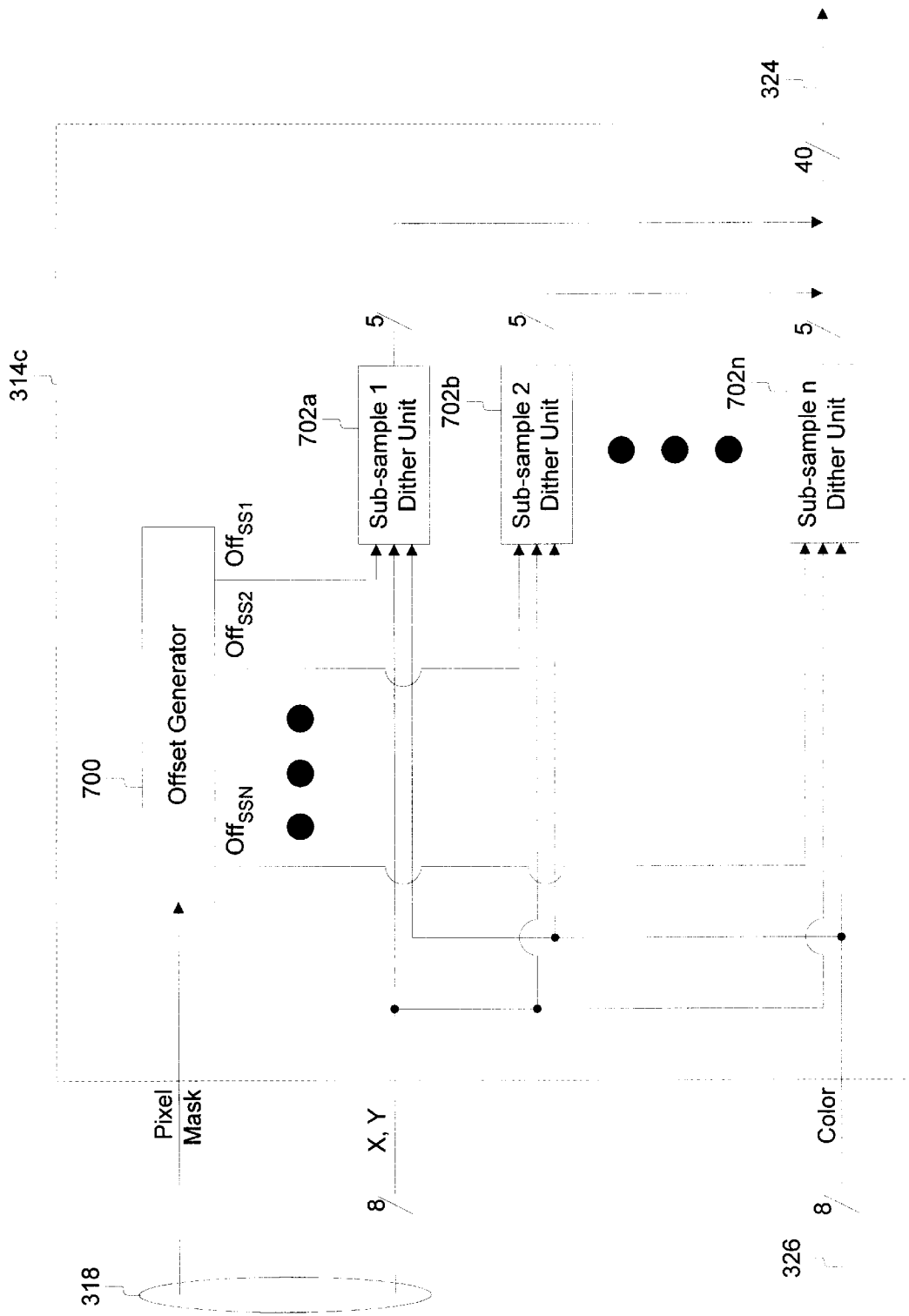
FIG. 7 is a third embodiment of the dither unit constructed according to the present invention.

FIG. 7 is a third embodiment of the dither unit 314c constructed according to the present invention where each of the sub-samples are dithered in parallel. While the third embodiment of the dither unit 314c is described as having three sub-sample dither units 702a, 702b, 702n, those skilled in the art will recognize that this embodiment could be expanded to include any number of sub-sample dither units 702a, 702b, 702n, and eight units 702a, 702b, 702n are preferred. The third embodiment of the dither unit 314c preferably comprises an offset generator 700, and a plurality of sub-sample dither units 702a, 702b, 702n. The offset generator 700 is similar to that described above for the second embodiment, however offset generator 700 produces a respective offset signal $Off_{ssn}$ for each sub-sample dither units 702a, 702b, 702n. Again, the offset generator 700 is coupled to line 318 to receive the pixel mask signal from the setup unit and registers 312 and has a respective output coupled to each of the sub-sample dither units 702a, 702b, 702n. Each of the sub-sample dither units 702a, 702b, 702n is also coupled to line 318 to receive the pixel coordinates for the sub-sample being processed from the setup unit and registers 312. Each of the sub-sample dither units 702a, 702b, 702n is also coupled to line 326 to receive a color value signal from the alpha blending unit 310. Each of the sub-sample dither units 702a, 702b, 702n is similar to the dither unit 314a described above with reference to FIG. 5. Finally, the outputs of the respective sub-sample dither units 702a, 702b, 702n are coupled by line 324 to the over sampling buffer 302. The third embodiment of the dither unit 314c is particularly advantageous because a number of sub-samples can be processed simultaneously and stored back to the over sampling buffer 302.

Figure 8:
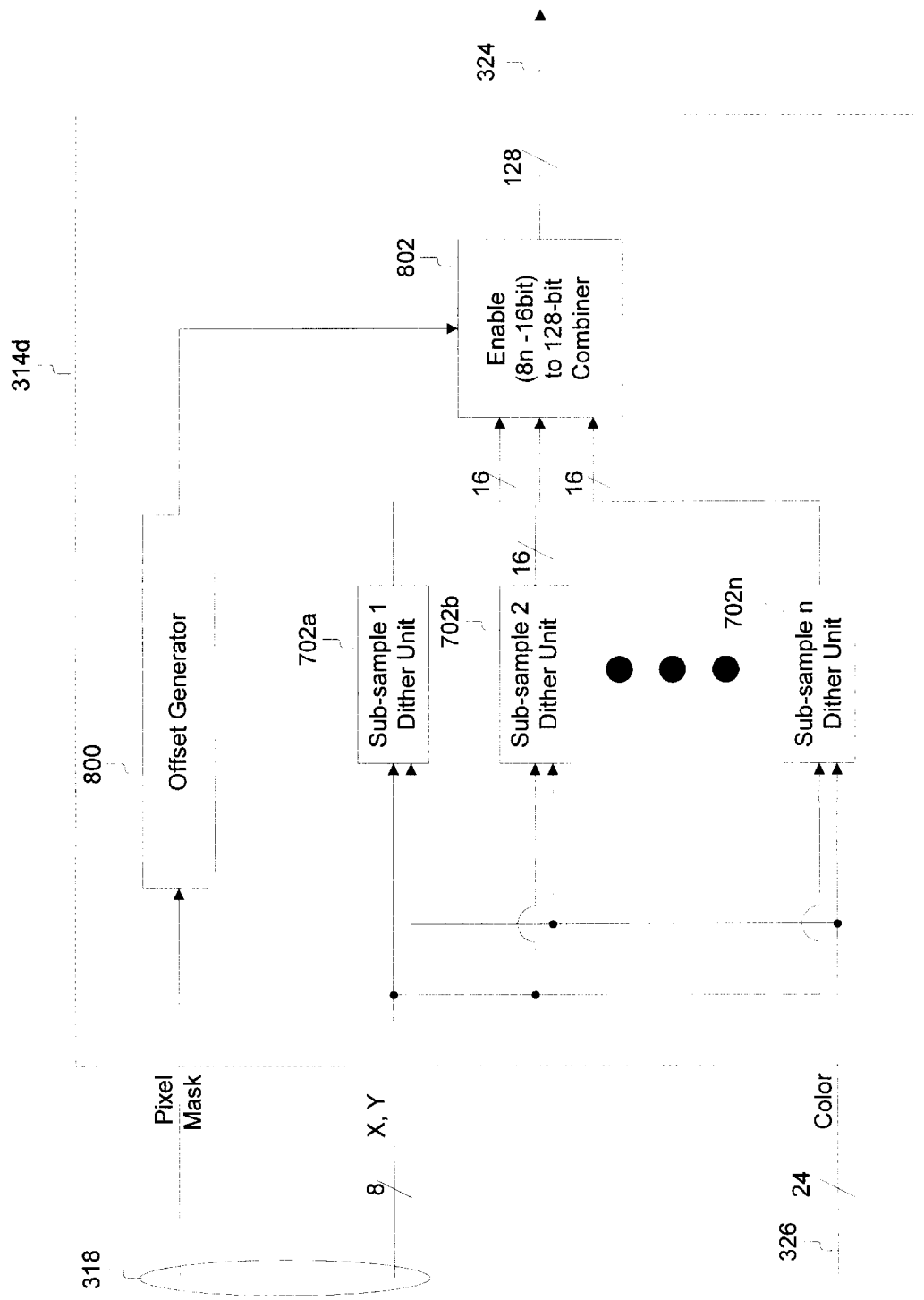
FIG. 8 is a fourth embodiment of the dither unit constructed according to the present invention.

FIG. 8 is a fourth embodiment of the dither unit 314d constructed according to the present invention where each of the sub-samples are dithered in parallel. While the fourth embodiment is similar to the third embodiment in that the dither unit 314d is described as having eight sub-sample dither units 702a, 702b, 702, although only three are shown, and could be expanded to include any number of sub-sample dither units 702a, 702b, 702n, the dither unit 314d processes each sub-samples in parallel but outputs them serially, and can have a different dither matrix for processing each sub-sample. Furthermore, like reference numerals have been used for like parts for convenience and ease of understanding. The fourth embodiment of the dither unit 314d preferably comprises an offset generator 800, a 128-bit (8n* 16-bit) enable and combine block 802 and a plurality of sub-sample dither units 702a, 702b, 702n. The offset generator 800 is similar to that described above for the second embodiment, however offset generator 700 produces an offset signal that selects one of the sub-sample dither units 702a, 702b, 702n to provide the output. Again, the offset generator 700 is coupled to line 318 to receive the pixel mask signal from the setup unit and registers 312 and has a respective output coupled to the select input of the output multiplexer 802. The offset generator 700 could be a converter of an eight-bit pixel mask to a three bit binary value or other similar logic configuration as those skilled in the art will recognize. Each of the sub-sample dither units 702a, 702b, 702n has a first input coupled to line 318 to receive the pixel coordinates for the sub-sample being processed from the setup unit and registers 312. Each of the sub-sample dither units 702a, 702b, 702n is also coupled to line 326 to receive a 24-bit color channel value signal from the alpha blending unit 310. The 24-bit color value is effectively copied to each sub-sample dither units 702a, 702b, 702n for use in dithering. Each of the sub-sample dither units 702a, 702b, 702n is similar to the dither unit 314a described above with reference to FIG. 5. Finally, the outputs of the respective sub-sample dither units 702a, 702b, 702n are coupled to respective inputs of the output enable and combiner 802. In response to the selected input, the output enable and combiner 802 provides at it output the bits output by one of the n sub-sample dither units 702a, 702b, 702n. The fourth embodiment of the dither unit 314d is particularly advantageous because it allows different dither matrices to be used for different sub-samples.

Figure 9:
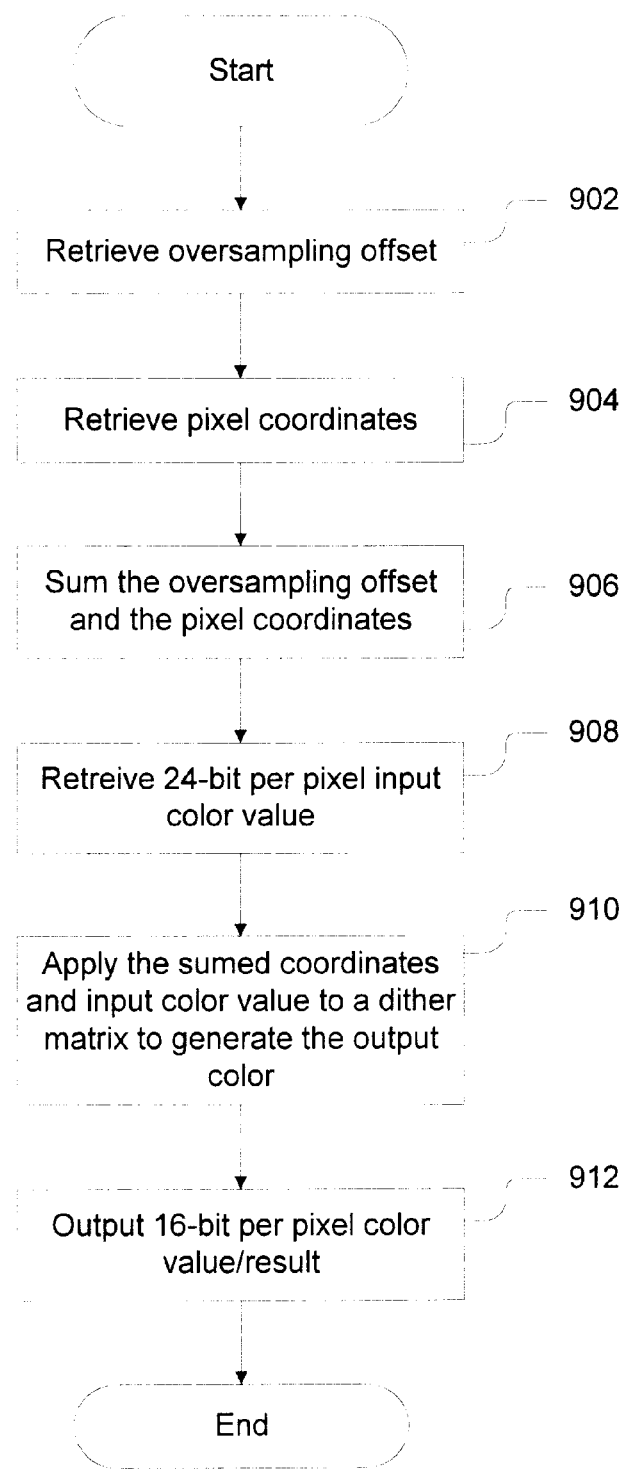
FIG. 9 is a flowchart of the preferred method for performing dithering according to the present invention.

FIG. 9 is a flowchart of the preferred method for performing dithering according to the present invention. The method begins in step 902 by either retrieving an sub-sample offset value from the setup unit and registers 312 or by generating the sub-sample offset value. Next, in step 904, the X and Y coordinates for the pixel to which the sub-sample corresponds are retrieved from the setup unit and registers 312 or otherwise determined. Then in step 906, the over sampling offset and the pixel coordinate are summed to produced new X and Y dither input values. The values can either be summed as a single value or individually summed. Then in step 908, a input color value is retrieved. This input color values is preferably a 24-bit input color value having eight bits for each channel in RGB format, for example. Next in step 910, the new X and Y dither input values and the input color value are applied to the dither matrix 400 to produce the output color values. In the preferred embodiment, there is separate dither matrix for each color channel such that an eight bit color value and the X, Y coordinates values are applied to the dither matrix to produce a resulting output color for a particular channel. The other channels have output color values generated in a similar manner. Once the color value for each channel has been generated, the color values are combined into a 16-bit per pixel color value and output as the result in step 912. Once the dithered values have been stored back in the over sampling buffer 302, the sub-samples forming each pixel are converted back to pixel values for storage in the frame buffer 202. More specifically, the eight sub-samples corresponding to a pixel are box filtered for storage as a single value in the frame buffer 202. In other words, the eight sub-samples are averaged to produce a value that can be stored back in the frame buffer 202 to represent the pixel.

While the present invention has been described with reference to certain preferred embodiments, those skilled in the art will recognize that various modifications may be provided. These and other variations upon and modifications to the preferred embodiments are provided for by the present invention.

What is claimed is:

1. A system for generating a dithered color value, the system comprising:

an over sampling buffer for generating multiple sub-samples representing each pixel;

an offset generator having an input and an output, for generating offset values, the input of the offset generator coupled to receive information about a relative position of a sub-sample being dithered;

an adjusted coordinate generator having a first input, a second input and an output, the adjusted coordinate generator producing adjusted coordinate values, the first input of the adjusted coordinate generator coupled to the output of the offset generator, and the second input of the adjusted coordinate generator coupled to receive pixel coordinates for the sub-sample being dithered; and a dither matrix having a first input, a second input and an output, for generating a dithered value for the sub-sample, the first input of the dither matrix coupled to the output of the adjusted coordinate generator, and the second input of the dither matrix coupled to receive a color value.

2. The system of claim 1 wherein the offset generator receives a pixel mask signal and generates an X offset value and a Y offset value.

3. The system of claim 1 wherein the offset generator receives a pixel mask signal and generates an X offset value selected from the group consisting of 00, 01, 10, 11 binary and a Y offset value selected from the group consisting of 00, 01, 10, 11 binary.

4. The system of claim 1 wherein the adjusted coordinate generator receives a pixel position and a sub-sample position, and the adjusted coordinate generator comprises an adder that sums the value of the pixel position and a sub-sample position.

5. The system of claim 1 wherein the adjusted coordinate generator receives an X and a Y pixel position and an X and a Y sub-sample position, and the adjusted coordinate generator comprises an adder that sums the X and the Y pixel position with the X and the Y sub-sample position.

6. The system of claim 1 wherein the adjusted coordinate generator is coupled to receive an X and a Y pixel position and an X and a Y sub-sample position, and the adjusted coordinate generator comprises a first adder and a second adder, the first adder coupled to receive the X pixel position and the X sub-sample position, and the second adder coupled to receive the Y pixel position and the Y sub-sample position.

7. A method for dithering color values, the method comprising the steps of:

over sampling a word representing a pixel to generate sub-samples that represent the pixel;

receiving an over-sampling offset value;

receiving coordinates for a pixel;

receiving a color value for the pixel;

generating a dither coordinate value by summing the over-sampling offset value with the coordinates for the pixel;

inputting the color value and the dither values to a dither matrix to generate an output color value.

8. The method of claim 7 wherein the step of receiving an over-sampling offset value includes the step of converting a pixel mask signal to an X offset value and a Y offset value.

9. The method of claim 7 wherein:

the step of receiving an over-sampling offset value includes the step of receiving an X offset value and a Y offset value;

the step of receiving coordinates for a pixel position includes the step of receiving an X value and a Y value; and the step of generating a dither coordinate value includes the step of summing the X value with the X offset value and the step of summing the Y value with the Y offset value.

10. The method of claim 7 wherein the step of inputting the color value and the dither coordinates to a dither matrix includes the steps of:

determining a location in a dither matrix specified by the dither coordinates;

determine a value corresponding to the location in the dither matrix;

adding the input color value to the value to produce a dither value;

determining whether the dither coordinate value is above a threshold; and biasing the color value if the dither coordinate value is above the threshold.

11. The method of claim 10 wherein the step of biasing the color value includes the step of increasing the color value by one if the dither coordinate value is above the threshold.

12. The method of claim 7 wherein the input color value is 24 bits per pixel and the output color value is 16 bits per pixel.

13. The method of claim 10 wherein:

the input color received is eight bits;

the values in the dither matrix range from zero (0000) to fifteen (1111) the step of adding the input color value to the value to produce a dither coordinate value includes the step of adding the value to the three least significant bits of the input color;

the step of determining whether the dither coordinate value is above a threshold includes the step of determining whether the dither coordinate value is greater than 1000; and biasing the color value includes the step of adding one to the five most significant bits of the input color value.

14. A system for generating a dithered color value for the sub-samples of a pixel, the system comprising:

an over sampling buffer for generating multiple sub-samples representing each pixel;

an offset generator having an input and outputs, for generating offset values, the input of the offset generator coupled to receive information about a relative position of a sub-sample being dithered;

a first sub-sample dithering unit having a first input, a second input, a third input and an output for generating a first dithered output color value, the first input of the first sub-sample dithering unit coupled to one of the outputs of the offset generator, the second input of the first sub-sample dithering unit coupled to receive coordinates of a pixel to be dithered, and the third input of the first sub-sample dithering unit coupled to receive an input color value; and a second sub-sample dithering unit having a first input, a second input, a third input and an output for generating a second dithered output color value, the first input of the second sub-sample dithering unit coupled to one of the outputs of the offset generator, the second input of the second sub-sample dithering unit coupled to receive coordinates of the pixel to be dithered, and the third input of the first sub-sample dithering unit coupled to receive the input color value.

15. The system of claim 14 wherein the offset generator receives a pixel mask signal and generates an X offset value and a Y offset value for each sub-sample.

16. The system of claim 14 wherein the offset generator receives a pixel mask signal and generates an X offset value selected from the group consisting of 00, 01, 10, 11 binary and a Y offset value selected from the group consisting of 00, 01, 10, 11 binary for each sub-sample.

17. The system of claim 14 wherein the first and second sub-sample dithering units each comprise:

an adjusted coordinate generator having a first input, a second input and an output, the adjusted coordinate generator producing adjusted coordinate values, the first input of the adjusted coordinate generator coupled to the output of the offset generator, and the second input of the adjusted coordinate generator coupled to receive pixel coordinates for the sub-sample being dithered; and a dither matrix having a first input, a second input and an output, for generating a dithered value for the sub-sample, the first input of the dither matrix coupled to the output of the adjusted coordinate generator, and the second input of the dither matrix coupled to receive a color value.

18. The system of claim 15 wherein the adjusted coordinate generator receives a pixel position and a sub-sample position, and the adjusted coordinate generator comprises an adder that sums the value of the pixel position and a sub-sample position.

19. The system of claim 15 wherein the adjusted coordinate generator receives an X and a Y pixel position and an X and a Y sub-sample position, and the adjusted coordinate generator comprises an adder that sums the X and the Y pixel position with the X and the Y sub-sample position.

20. The system of claim 15 wherein the adjusted coordinate generator is coupled to receive an X and a Y pixel position and an X and a Y sub-sample position, and the adjusted coordinate generator comprises a first and second adders, the first adder coupled to receive the X pixel position and the X sub-sample position, and the second adder coupled to receive the Y pixel position and the Y sub-sample position, the output of the first and second adders coupled to the dither matrix.

* * * * *